United States Patent [19]
Patino

[11] Patent Number: 5,825,159
[45] Date of Patent: Oct. 20, 1998

[54] BATTERY CHARGING METHOD FOR PROPERLY TERMINATING RAPID CHARGE

[75] Inventor: Joseph Patino, Pembroke Pines, Fla.

[73] Assignee: Motorola, Inc., Schaumburg, Ill.

[21] Appl. No.: 939,636

[22] Filed: Sep. 29, 1997

[51] Int. Cl.$^6$ .............................. H02J 7/04; H02J 7/06
[52] U.S. Cl. ........................................ 320/125; 320/150
[58] Field of Search ................................. 320/124, 125, 320/144, 150, 153, 160, 163, 134, 121

[56] References Cited

U.S. PATENT DOCUMENTS

| | | | |
|---|---|---|---|
| 5,103,156 | 4/1992 | Jones et al. | 320/150 |
| 5,241,259 | 8/1993 | Patino et al. | 320/35 |
| 5,411,816 | 5/1995 | Patino | 429/7 |
| 5,493,199 | 2/1996 | Koenck et al. | 320/106 |
| 5,563,494 | 10/1996 | Cuesta et al. | 320/150 |

*Primary Examiner*—Edward Tso
*Attorney, Agent, or Firm*—Barbara R. Doutre

[57] ABSTRACT

A trickle wait state (225) is included in a charging routine (200) prior to initiating any rapid charge of the battery (234). The wait state (225) allows the battery temperature (Rt) to reach equilibrium with the ambient temperature (214–224) before application of any rapid charge current to the battery so that $\Delta T/\Delta t$ termination can be used, even in an uncontrolled temperature environment. The wait state (225) trickle charges (216) the battery for a time interval (218) and measures and stores the battery temperature before and after this time interval (214, 220). The battery continues to be trickle charged until the battery temperature reaches equilibrium with the temperature of the environment (222), at which time rapid charging (234) of the battery can commence.

5 Claims, 2 Drawing Sheets

BATTERY CHARGING METHOD FOR PROPERLY TERMINATING RAPID CHARGE

TECHNICAL FIELD

This invention relates to battery chargers, and more particularly to battery charging methods.

BACKGROUND

Many battery chargers are used in controlled temperature environments, such as table top chargers for portable radios. In controlled temperature environments, the temperature and charging characteristics are predictable and therefore charging techniques based on temperature slopes can be utilized. The temperature slope characteristic known as $\Delta T/\Delta t$ measures the rise in battery temperature over time during the charge sequence and causes the charger to switch from rapid charge to trickle charge once a threshold change in temperature slope is detected. This $\Delta T/\Delta t$ termination technique is based on the concept that batteries stay at substantially the same temperature during the charge sequence, and once fully charged, become exothermic—that is, the extra current going into the battery is no longer accepted and turns into heat. Thus, the rise in battery temperature determines when the battery is fully charged.

Rechargeable battery powered products, such as portable radios, which operate and recharge in uncontrolled temperature environments, such as vehicular environments, may experience inadequate recharging of their batteries. For example, taking a battery powered radio from room temperature and charging it in a hot car can result in the battery outer housing and internal cells heating up at a high rate causing a standard $\Delta T/\Delta t$ termination algorithm to prematurely trip to trickle charge. Usually a charge complete or trickle charge indicator, such as a green light emitting diode (LED), indicates to users that the battery is fully charged. Under this scenario, a battery can be almost completely discharged, and the user thinks the battery is fully charged because of the green led indicating trickle charge. Thus, $\Delta T/\Delta t$ algorithms are usually avoided in vehicular adapter designs, and usually, temperature cutoff (TCO) termination algorithms are used instead. TCO algorithms basically rapid charge the battery until the cell temperature meets an absolute predetermined temperature threshold. The disadvantage to the TCO approach, however, is that the battery may become overcharged while waiting for the cell temperature to meet the detection threshold. This overcharging affects the battery's cycle life performance and causes nickel metal hydride (NiMHi) and nickel cadmium (NiCad) battery incompatibility issues.

Accordingly, there is a need for an improved battery charging method which properly terminates rapid charge in non-controlled temperature environments.

DETAILED DESCRIPTION OF THE PREFERRED EMBODIMENT

Figure 1:
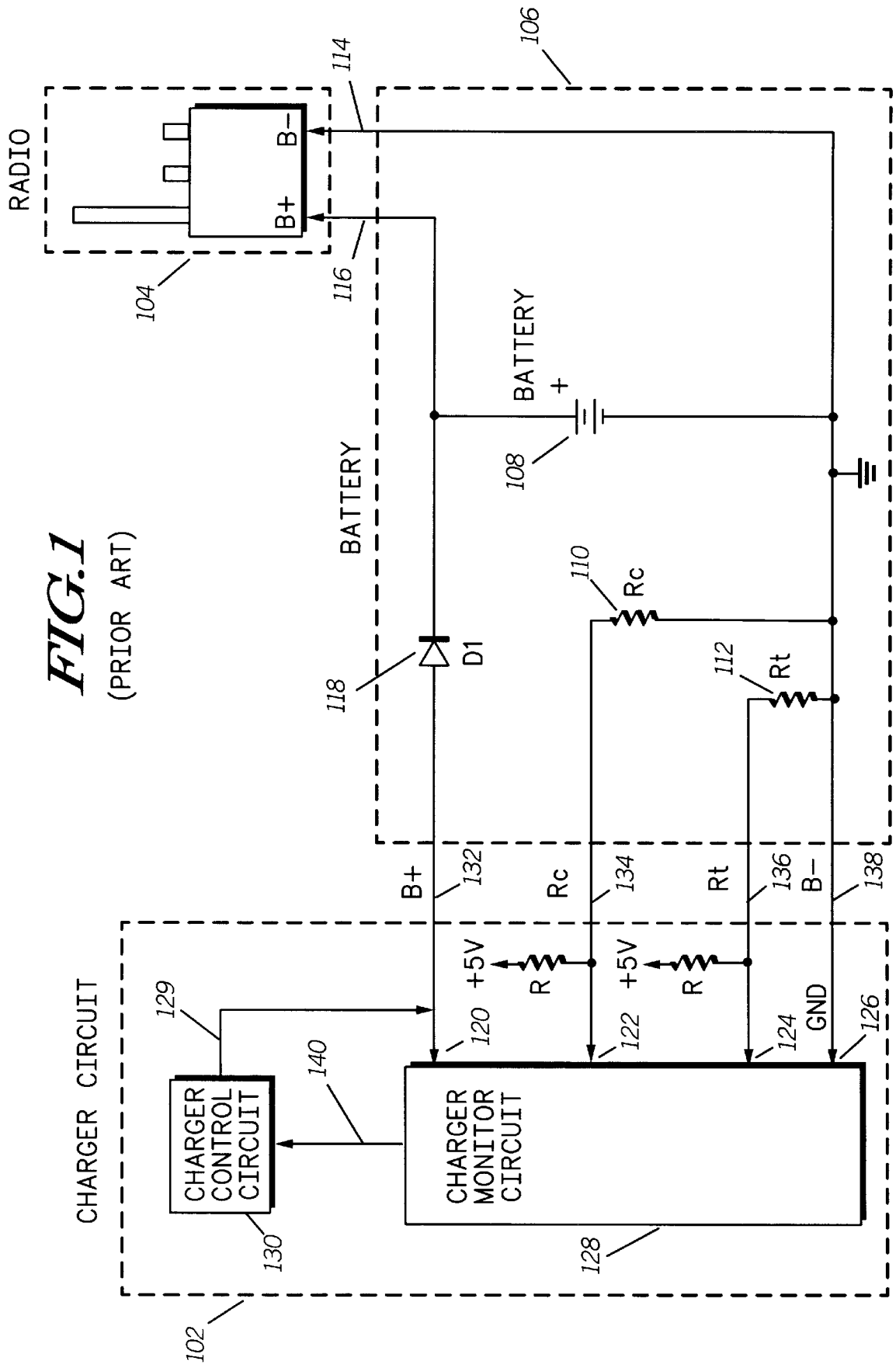
FIG. 1 is a prior art charging system.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a prior art battery charging system described in U.S. Pat. No. 5,411,816 assigned to Motorola, Inc., which is herein incorporated by reference. The charging system of FIG. 1 includes a charger 102, a battery 106, and a radio 104. The battery 106 includes a B+ voltage terminal, a B− voltage terminal, a Rc capacity terminal, and a Rt thermistor terminal for battery temperature. The charger 102 includes control circuitry 130 and monitor circuitry 128 which can read and store battery parameter data through the B+, Rc, and Rt terminals. The charging routine to be described herein can be incorporated into this or any number of other chargers, both in controlled and uncontrolled temperature environments.

Briefly, in accordance with the present invention, a "wait state" has been added to a charging algorithm before initiating any rapid charge of the battery. This wait state allows the battery temperature to reach equilibrium with the ambient temperature before application of any rapid charge current. The wait state of the present invention allows the battery to reach equilibrium with the environment temperature which now allows for $\Delta T/\Delta t$ termination to be used in chargers charging in uncontrolled temperature environments and allows chargers to be compatible with NiMH chemistry battery cells.

Figure 2:
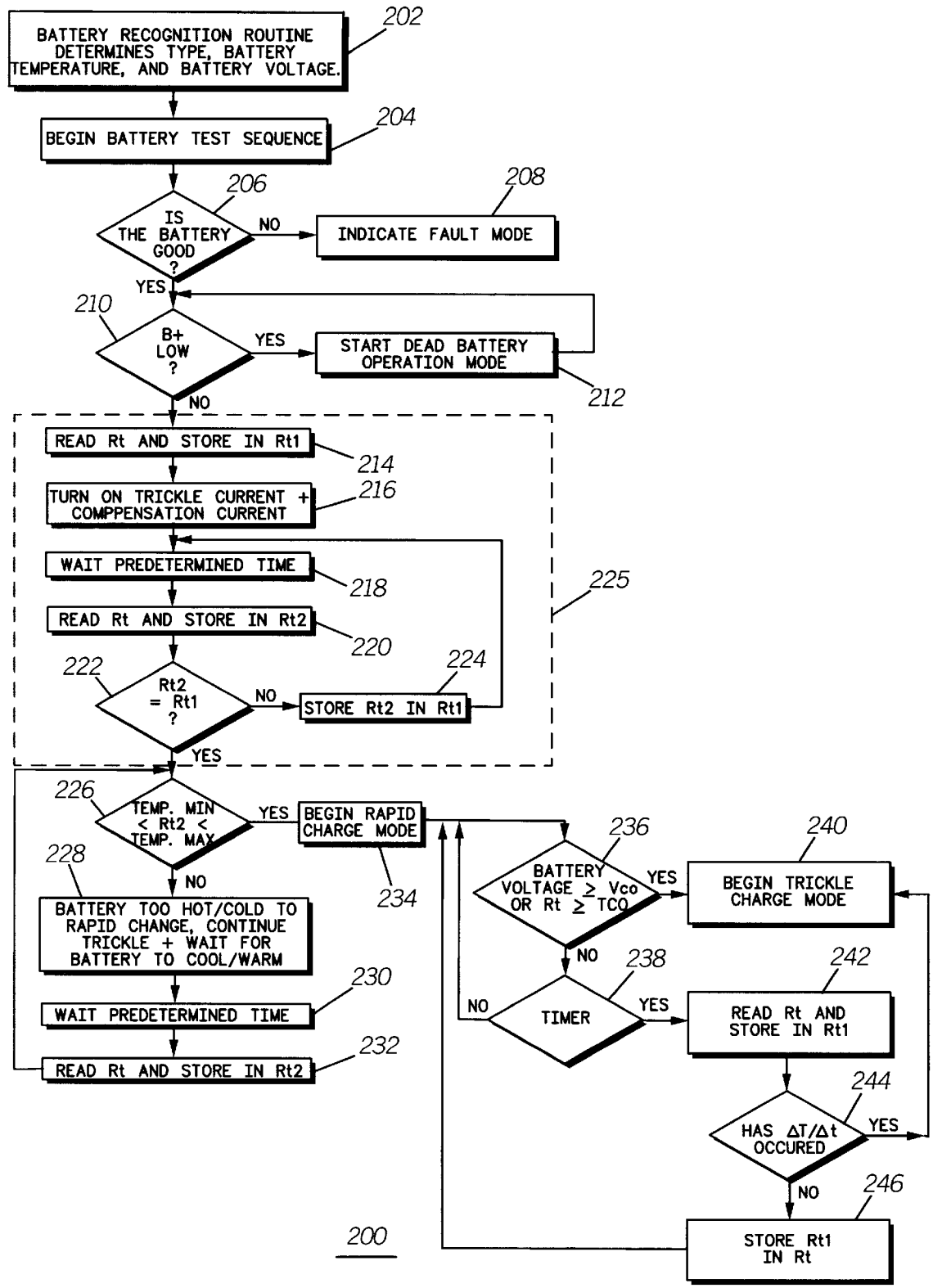
FIG. 2 is a charging routine in accordance with the present invention.

Referring now to FIG. 2, there is shown a flowchart of a charging routine 200 in accordance with the present invention. Charging routine 200 can be used in a number of charger/battery configurations, such as the battery/charger configuration shown in FIG. 1. The charging routine 200 begins at step 202 using a battery recognition scheme to determine the battery type, battery temperature, and battery voltage. Step 202 can be accomplished, for example, by reading the battery's Rc value, the Rt value, and B+ value in a manner known in the art. A battery test sequence is begun at step 204, this is preferably indicated to the user by an indicator such as a red LED on the charger. Step 206 determines if the battery is good by looking at the parameters measured in step 202 and comparing them to predetermined thresholds. If the battery is determined not to be good then a fault mode is indicated, such as through a combination green/red LED at step 208. If the battery is determined to be good at step 206, the routine goes on to step 210 where the battery voltage is compared to a predetermined battery voltage level. If the battery voltage falls below the predetermined battery voltage level at step 210, the battery is deemed to be a dead battery and a dead battery charge mode of operation commences at step 212. Typically, dead battery operation involves rapid charging the battery to quickly get the battery voltage up to a level where the radio will operate. The battery continues to be rapid charged at step 212 and monitored at step 210 until the battery voltage reaches an acceptable level.

Once the battery voltage value reaches an acceptable level at step 210, the routine continues to step 214 where, in accordance with the present invention, the charger reads and stores the battery temperature as Rt1. The routine continues on to step 216 where the charger commences to trickle charge the battery and supply any required compensation current for radio operation. The charger continues to trickle charge for a predetermined time at step 218. Step 218 provides a wait state and can be set for a time determined to be acceptable by the system designers, for example 1 minute. After waiting the predetermined time limit at step 218, the charger reads the battery temperature Rt again and stores this value as Rt2 at step 220. At step 222, the temperature values of Rt1 and Rt2 are compared. If Rt2 is not equal to Rt1, then the value of Rt2 is stored in the value of Rt1, and the routine returns back to step 218 to continue the trickle charge wait state and then Rt2 is read again at step 220. In accordance with the present invention, steps 214–224 provide a feedback trickle charge wait state 225 which continues to trickle charge the battery until the battery temperature stored as Rt2 is substantially equivalent to the stored Rt1 value. Thus, the battery remains in a trickle charge wait state until the battery temperature reaches an equilibrium with the ambient temperature.

When the second stored battery temperature Rt2 is substantially equivalent to the first stored battery temperature Rt1 at step 222, then step 226 verifies if the latest battery temperature reading, Rt2, falls within a predetermined threshold, for example 10°–50° Celsius (°C.). Rapid charging of the battery occurs at step 234 when the battery temperature falls within the predetermined temperature window at step 226. If the battery temperature exceeds the maximum temperature threshold at step 226, then the battery is too hot to rapid charge, and the charger will continue to trickle charge and provide any required compensation current at step 228. Conversely, if the battery temperature is less than the minimum temperature threshold at step 226, then the battery is too cold to rapid charge, and the charger will continue to trickle charge and provide any required compensation current at step 228. Thus, once the battery temperature falls outside the threshold window set at step 226, the charger will continue trickle charge and provide compensation current for a predetermined time set at step 230. The battery temperature, Rt, is then read and stored as Rt2 at step 232. The routine returns back to step 226 where the comparison is made again using the newly stored Rt2 temperature value. Steps 226–232 comprise a second wait state which is preferably included as part of the charge routine so that the charger waits for the battery to cool down from a hot state or warm up from a cold state before applying rapid charge current.

Once it is determined at step 226 that the stored battery temperature falls within the predetermined temperature window, then rapid charging begins at step 234. The charge routine then proceeds to check, at step 236, whether the battery voltage, B+, has reached or exceeded a maximum voltage cutoff threshold, Vco, or whether the battery temperature, Rt, has reached or exceeded a maximum temperature cutoff threshold, Tco. These two conditions are monitored throughout a predetermined time period set at step 238. If either of the Vco or Tco thresholds have been exceeded, the charger will begin to trickle charge the battery at step 240. The trickle charge condition is preferably indicated to the user through a green LED. If neither the Vco nor Tco thresholds are exceeded within the predetermined time period specified by the timer in step 238, the charger then reads the temperature of the battery at step 242 and stores the value as Rt1. Next, the charger checks if a $\Delta T/\Delta t$ slope has occurred at step 244.

The $\Delta T/\Delta t$ measurement is calculated by taking the difference between the latest stored values of Rt2 (battery temperature at the start of the time period) and Rt1 (battery temperature at the end of the time period) over the predetermined time period set by step 238. If the $\Delta T/\Delta t$ slope exceeds a predetermined threshold, such as a 1.8° C. rise over three minutes, then the charger will return to step 240 to trickle charge the battery. If the $\Delta T/\Delta t$ measurement does not meet the required threshold, the charger will proceed to step 246 and store the Rt1 temperature as Rt2. The charger will then continue rapid charging the battery and return to step 236.

By allowing the battery temperature to reach equilibrium with the ambient temperature before initiating the rapid charge sequence in accordance with the present invention, the charger can now properly charge the battery without fear of prematurely terminating the rapid charge sequence caused by differences in battery temperature and ambient temperature. Thus, the charger is no longer required to terminate with a temperature cutoff (TCO) termination algorithm thus reducing the likelihood of overcharging. The wait state 225 described by the invention improves the battery cycle life performance and allows for true NiMHi battery compatibility.

The trickle wait state 225 described by the invention works equally well for batteries going from a cool environment to a hot environment as well as a hot environment to cool environment. In the past, if a user were to place a warm, fully charged battery, into a cold charger, the charger would not normally switch to trickle charge, because the ambient temperature would falsely keep the battery temperature cool. Thus, a fully charged battery would be overcharged by the charger, because the TCO or $\Delta T/\Delta t$ would take an exceedingly long time to occur. The charging routine 200 described by the invention prevents this scenario from happening by letting the user get in the car, turn on the heater, and trickle charge the battery until temperature equilibrium is reached between the battery and the car before performing any rapid charging or checking the $\Delta T/\Delta t$. Thus, for the ten minutes or so that it might take the car to warm up, the battery is not being overcharged.

Thus, the trickle wait state 225 described by the invention allows the battery temperature to reach equilibrium with the ambient temperature before application of any rapid charge current to the battery to alleviate premature $\Delta T/\Delta t$ termination. The trickle wait state described by the invention allows for $\Delta T/\Delta t$ termination to be used in chargers charging in uncontrolled temperature environments, such as encountered with vehicular adapters. Regardless of controlled or uncontrolled temperature environments, the trickle wait state described by the invention allows chargers to utilize $\Delta T/\Delta t$ termination and provide compatibility with a variety of battery chemistries including but not limited to NiMH and NiCad chemistries, thereby expanding the charging capability of chargers.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging a battery in a charger, comprising the steps of:

determining if the battery is a good battery;

determining if the battery voltage has reached a predetermined battery voltage level;

measuring the battery temperature;

storing the battery temperature as a first battery temperature;

applying trickle charge current to the battery for a predetermined time limit;

re-measuring the battery temperature after the predetermined time limit;

storing the re-measured battery temperature as a second battery temperature;

comparing the first and second stored battery temperatures;

determining if the first stored battery temperature is substantially equal to the second stored battery temperature;

re-storing the second stored battery temperature as the first stored battery temperature when the second stored battery temperature is not substantially equal to the first stored battery temperature;

repeating the steps applying through comparing until the first stored battery temperature is substantially equal to the second stored battery temperature;

rapid charging the battery when the first stored battery temperature is substantially equal to the second stored battery temperature;

performing a $\Delta T/\Delta t$ measurement on the battery; and terminating the rapid charging if the $\Delta T/\Delta t$ measurement exceeds a predetermined threshold.

2. The method of claim 1, wherein the step of terminating further includes the step of trickle charging the battery when the $\Delta T/\Delta t$ exceeds the predetermined threshold.

3. The method of claim 1, wherein the batteries are characterized by a nickel metal hydride chemistry.

4. The method of claim 1, wherein the battery is characterized by a nickel cadmium chemistry.

5. The method of claim 1, wherein the charger is located in an uncontrolled temperature environment.

* * * * *